March 10, 1970    W. P. BAZINET, JR., ET AL    3,500,238
LASER ASSEMBLIES AND THE LIKE
Filed March 6, 1967
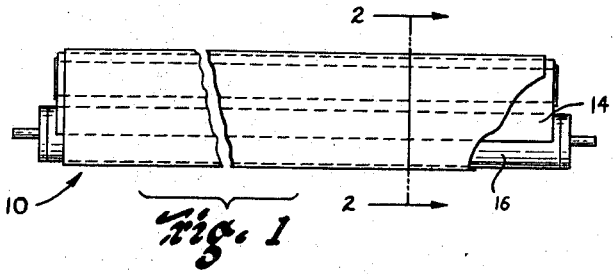
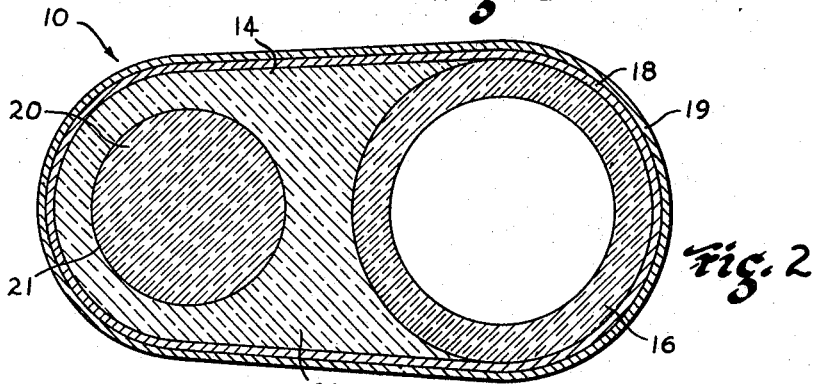
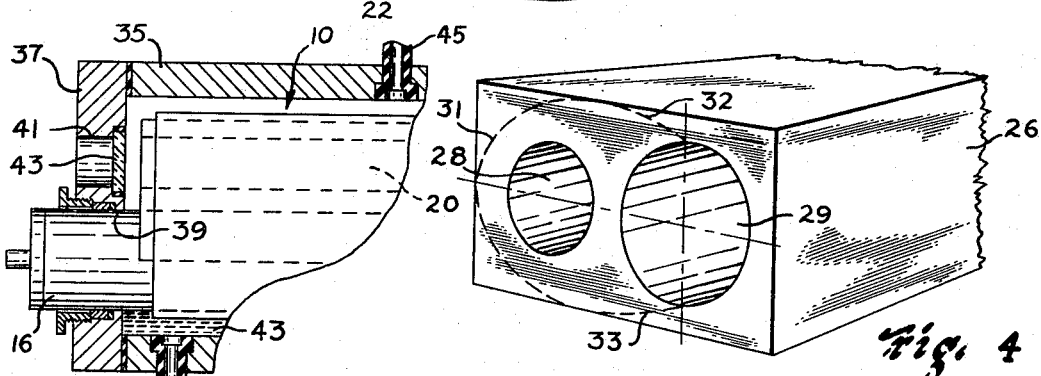
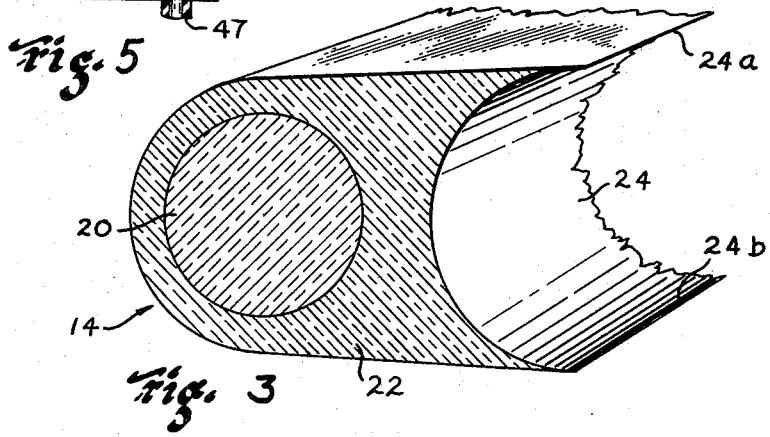
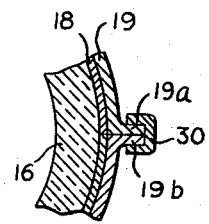
INVENTORS
WILFRED P. BAZINET JR
CHARLES G. YOUNG
BY
ATTORNEY United States Patent Office 3,500,238
Patented Mar. 10, 1970

3,500,238
LASER ASSEMBLIES AND THE LIKE
Wilfred P. Bazinet, Jr., Webster, Mass., and Charles Gilbert Young, Storrs, Conn., assignors, by mesne assignments, to American Optical Company, Southbridge, Mass., a corporation of Delaware
Filed Mar. 6, 1967, Ser. No. 620,704
Int. Cl. H01s 3/00
U.S. Cl. 331—94.5
2 Claims

ABSTRACT OF THE DISCLOSURE

Laser assembly employing rod-like component of laser glass embedded within cladding glass which partially surrounds flash tube and providing high operating efficiencies and good heat conductivity and dissipation.

---

This invention relates to light-generating and light-amplifying laser assemblies and the like of such new improved and carefully controlled construction and arrangement as to enable said assemblies to be more efficiently manufactured and assembled and more efficiently operated and maintained than has been possible heretofore in more or less comparable high efficiency laser devices of earlier design. The invention also includes a method of making such devices.

More particularly, the invention relates to laser light-generating and laser light-amplifying assemblies, devices, and the like, which in each instance employs a thin elongated main body structure and an elongated flash tube in closely nested assembled but separable relation to each other and light-reflecting and heat-dissipating means associated therewith so as to effect a highly efficient assembly or device. Said main body structure, in turn, comprises a thin, elongated rod-like or fiber-like component formed of laser glass of a predetermined refractive index which is surrounded throughout its length by a cladding of glass of carefully selected kind so as to function as desired therewith. Said cladding glass is, in fact, preferably of substantially the same refractive index as said laser component or core and is disposed in intimate optical contact with the smooth side wall portions of said component so that substantially all optical effects of an interface therebetween are removed. It would be possible, however, to select a cladding glass having a slightly higher or a slightly lower refractive index than that of the laser component, should such be desired. Furthermore, said elongated component and said cladding together are of such controlled cross-sectional dimensions and predetermined peripheral shape and said cladding provided in one side thereof with a concave longitudinal recess and so finished as to receive in closely nesting substantially parallel side-by-side relation thereto a substantial part of the exterior surface area of the flash tube associated therewith. Also, a small amount of a suitable liquid may be used in the recess between the laser structure and the flash tube before they are pressed together and thus obtain better thermal conductivity therebetween.

Thus, the elongated flash tube light source for optically pumping the laser assembly may be, to a large degree, surrounded by the cladding material and in such a way that much of the light will be directed with a minimum of reflections from said flash tube into the laser component and also, said cladding material will be in contact with said flash tube in such a way as to provide a good direct path for radial heat conduction from the flash tube to the exterior of the assembly during operation of the device. Also, a flash tube formed of a high silica borosilicate type of glass, such as Pyrex, is preferred since same has a coefficient of thermal expansion which more nearly matches that of the glass of the laser structure, and also since this type of glass will absorb much of the undesired ultraviolet light being radiated by the flash tube.

The assembled main body structure and the flash tube in nested relation therewith are completely surrounded throughout substantially their lengths by a highly reflective first layer of metallic material and then by a heavier second layer of a different metallic material which is such as to provide high heat conductivity. If desired, these two layers may be arranged so as to be readily removable when required. Furthermore, if desired, an outer casing containing a suitable fluid for cooling purposes may be employed about the laser assembly and also, when desired, same may be provided with means for re-circulating the cooling fluid during laser operation.

In co-pending application Ser. No. 539,041, filed Mar. 31, 1966, and assigned to the assignee of the instant application, there is disclosed a unitary laser device which is not only relatively economical to manufacture but also is capable of obtaining high operating efficiencies during use thereof. These results are obtained partly due to the fact that both the elongated rod-like laser component and the associated flash tube means for pumping purposes are both embedded within the same cladding glass in such a way as to obtain an efficient optical coupling between the laser component and the light source and also good radial dissipation of the heat being generated thereby outwardly through the cladding material. Thus, it will be appreciated that both the rod-like laser component and the flash tube cavity of the unitary construction of said earlier application are advantageously immersed within the cladding glass. By such an earlier closely coupled arrangement, it is possible to obtain high pumping efficiencies with a minimum of light reflections at the outer surface of the cladding as well as good radial heat dissipation to the outside. However, at times, heretofore malfunctioning, or the like, of the flash tube portions of said earlier laser devices has occurred and, at such times, the entire laser assembiles have been rendered inoperative.

In the improved laser assemblies and devices of the present construction, however, wherein each laser assembly comprises a unitary main body structure and separate flash tube and each main body structure comprising a thin, elongated laser component and a cladding arranged in surrounding contacting relation thereto and the unitary main body structure is carefully controlled as to predetermined dimensions and shape so as to receive the flash tube in closely nested side-by-side relation thereto, not only are the advantages of said earlier unitary laser structure retained to a very high degree but, furthermore, the flash tube portion of such a separate assembly may be readily replaced without much difficulty, should such be required.

It is, accordingly, an object of the present invention to provide a laser assembly, or device, comprising a unitary main body structure and a separable flash tube in nested closely coupled relation therewith and with said main body structure comprising a thin, elongated rod-like or fiber-like component formed of laser glass of a predetermined refractive index and a cladding of glass of a different kind but of substantially the same or nearly the same index arranged in surrounding relation thereto and in intimate optical contact with the smooth side wall portions of said laser component, and futrher with said cladding glass also being of such geometric configuration as to closely receive in an elongated concave recess suitably formed in a side wall portion thereof a flash tube of proper predetermined dimensions and emission characteristics, and with or without a suitable liquid for heat conductivity sealed therebetween, and with these assembled parts being contained within a suitable reflecting first layer or coating of metallic material and, if desired, also within a second outer heavier layer or coating of suitable heat-conducting metallic material for providing high dissipation of heat from the laser assembly to the exterior during operation thereof.

It is another object of the invention to provide for such a laser assembly an outer casing of suitable size and shape to receive said elongated main body structure and said separable flash tube, said casing being provided with suitable windows in aligned relation to the laser component of the assembly and said casing being constructed and arranged so as to contain a cooling liquid or the like for immersing said laser structure therewithin.

It is a further object of the invention to provide for such a casing as mentioned above suitable conduit means through which said cooling liquid may be circulated during operation of the structure.

Other objects and advantages of the present invention will become apparent from the description which follows when taken in conjunction with the accompanying drawings in which:

FIG. 1 is a side elevational view showing a laser assembly embodying the invention, a part thereof being broken away to better show details thereof;

FIG. 2 is an enlarged cross-sectional view taken substantially upon section line 2—2 of FIG. 1 and looking in the direction of the arrows;

FIG. 3 is a cross-sectional view of a main body structure which may be used in the laser assembly of the present invention;

FIG. 4 is a perspective view showing a block-like glass member which may be employed in carrying out method steps of the invention;

FIG. 5 is a fragmentary view showing an end portion of a modified form of the invention, and with certain parts thereof being shown in cross-section; and FIG. 6 is a fragmentary cross-section view showing a modified form of construction.

Referring to the drawings in detail and in particular to FIGS. 1 and 2, it will be seen that numeral 10 indicates generally a laser assembly comprising a relatively thin, elongated unitary or integral main body structure 14 and a separable elongated straight-sided cylindrically-shaped flash tube 16 disposed in closely nested generally parallel side-by-side relation to each other. Around the outer side of this unitary main body structure 14 and flash tube 16 in assembled relation to each other is disposed a first layer 18 of suitable metallic material of high light reflectivity and also good heat conductivity, such as silver, and about this first layer is disposed a second appreciably heavier layer 19 of suitable metallic material of good heat conductivity such as copper or the like.

From FIG. 2, it can be readily seen that the unitary main body structure 14, in turn, comprises a relatively thin, elongated rod-like or fiber-like component 20 which is formed of a suitable laser glass and has smooth side wall portions 21 therein. About this rod-like component and extending throughout the length thereof is disposed a cladding 22 of glass of a different selected kind as will be explained more fully hereinafter. The laser glass, which may be, for example, a trivalent neodymium-doped barium crown laser glass, or an ytterbium-neodymium doped laser glass or an erbium-ytterbium-neodymium doped laser glass, has a predetermined refractive index and the cladding glass to be used in intimate surrounding relation therewith will be carefully chosen not only so as to have nearly or substantially the same refractive index as the laser glass but also chosen so as to be highly transparent to optical energy at the pumping wavelengths of said laser glass. Additionally, when desired, this cladding glass will be chosen so as to have good light-absorbing characteristics for optical energy at the emission wavelength of the laser material. Also, the cladding glass should be carefully chosen so as to be compatible with the laser glass during all operating conditions of the structure. When absorption of optical energy at the laser emission wavelength is desired, the cladding glass may be a samarium or dysprosium doped barium crown glass, or if such absorption is not required, the cladding glass may be undoped barium crown glass.

The cladding glass 22 surrounds the laser component 20 throughout its entire length and in closely adjacent relation to the laser component 20 is provided, as shown in FIGS. 2 and 3, a concavely curved polished recess 24 which also extends the entire length of the main body structure 14 and is of such size and shape as to receive in closely nesting relation therewith a substantial outer side wall portion or surface area of the flash tube 16. Furthermore, it should be appreciated that the outer peripheral shape of cladding 22 at parts adjacent this recess 24 is carefully controlled so as to extend a material distance around the circumference of the flash tube and nearly into tangential relation therewith when the parts are assembled. As shown in FIG. 2, for instance, the extent of the cladding in contact with the flash tube is an amount equal to between one-third and one-half of the total circumference of the flash tube. In order to have as good heat conductivity as possible between the flash tube and the laser cladding, a small amount of Freon liquid or the like may be placed therebetween before same are pressed together. Thereafter, the entire exposed joint between these parts may be sealed by a thin layer of epoxy cement or the like.

While the upper and lower surfaces of the cladding, as viewed in FIG. 2, are nearly straight or flat, it would be possible to have these upper and lower surface portions curved somewhat so as to more nearly directly reflect light received from the flash tube toward the laser component. It is interesting to note that the amount of cladding glass employed will purposely be kept as small as conveniently possible since this will allow the heat being generated within the flash tube during laser operation to reach the exterior of the assembly and be dissipated more rapidly. This is more important, of course, when high repetition pulse rates for the flash tube are used.

About the outer surface of the main body structure and the flash tube, when assembled, is disposed the first light-reflecting layer or coating 18 in closely fitting relation thereto, or even in vacuum-deposited optical contact therewith, for obtaining as high light-reflecting and heat-conducting efficiencies as possible. In this respect, of course, it should be kept in mind that the more directly the optical energy of the flash tube can be directed into the laser component without experiencing extra reflections at the outer wall portions of the main body structure, and the more directly the heat being generated within the flash tube can be conducted to the exterior of the assembly, the more efficient will be the laser operation obtained. Additionally, the second heavier metallic layer 19 of good heat-conducting properties will be disposed in intimate contact with said first layer.

Very efficient laser operating results can be obtained by improved laser assemblies or devices of the present disclosure. However, should failure of the flash tube portion of the present laser assembly shown in FIG. 2 occur, it would only be necessary to cut away or otherwise remove the first and second encircling layers of metallic material from the assembly and break the sealed joint in order to remove the flash tube 16 and replace same by another and new first and second layers. At such times, the quality of the main body structure 14 which is, of course, the more costly part of the assembly will not in any way be injured or altered insofar as its laser operating properties are concerned.

Instead of having to resort to such repair operations, it would be possible, if desired, to provide the enclosing first and second layers of metallic material with longitudinally extending flanges or the like, such as shown at 19a and 19b in FIG. 6, and to even releasably hold these flanged parts together by means of suitable clamping means, such as by elongated C-shaped channels or the like 30.

The unitary main body structure 14 comprising the elongated laser component 20 and the surrounding cladding material 16, and provided with the recessed portion 24, may be produced by the following method. Firstly, a suitable piece or block of glass to ultimately form the cladding 16 (such as suggested at 26 in FIG. 4) is selected and drilled longitudinally to provide it with a pair of parallel suitably spaced holes or bores 28 and 29 having suitably related diameters. The bores 28 and 29 are then carefully ground and polished so as to have optically finished surfaces thereon. The glass block is then cut right down through the middle of one of said holes or bores, the larger one which is to later receive the flash tube; this cut being made at right angle to a longitudinal central plane through said block and containing the axes of both bores.

The "edge portions" of the block adjacent this cut partially cylindrical surface will then be "ground back" or inwardly, as indicated by dotted lines 32 and 33, until that part of the block which remains will enclose or nearly enclose a half-circular recess which terminates, as shown in FIG. 4, in a pair of feather edges 24a and 24b. The block 26 is then ground away upon its outer surfaces so as to remove all other "extra" portions of the block and thus effect an outer contour much like that jointly indicated by dotted lines 31, 32 and 33.

The "contoured" block will then be subjected at one end to a heating and drawing operation in a manner well known in the art, whereby one end will be drawn down until an elongated member (not shown) but of the suitable cross-sectional dimensions desired is produced. This drawing-down step provides fire-polish upon all of the exposed surfaces of the resulting member. The desired dimensions, of course, would be such that the diameter of the circular hole which remains therein will accommodate the rod of laser glass selected for use therewith. The laser rod is then inserted in this hole and the assembly thus formed drawn down further to a size just sufficient to receive the outer surface portion of the particular flash tube selected for use therewith within the partially cylindrical elongated recess 24 thus formed. The "drawn-down" composite structure, including the elongated laser component, will then be cut to proper length and its ends will then be accurately ground and polished to the predetermined shape and angularity desired. If desired, they may be silvered to produce a resonant laser cavity therebetween.

Thereafter, assembly will be produced by inserting the flash tube laterally into the elongated recess or concavity 24 so formed, the assembled parts wrapped or otherwise provided with the highly reflective outer first and second layers of metallic material previously mentioned. As stated previously, it is preferable that the flash tube 16 be formed of a high silicate borosilicate type of glass although ones made of other types of glass or even of fused quartz could be used.

As stated earlier, a modified arrangement including the improved laser assembly 10 being described herein may be produced by providing, as shown in FIG. 5, an outer casing 35 about the laser assembly and with this casing having a suitable pair of end walls (only one of which is shown at 37), said end walls each having an opening 39 therein for allowing an end of the flash tube 16 to extend therethrough as well as a second opening 41 provided with an optically flat window 43 disposed in alignment with the laser component 21 of the assembly. A suitable liquid coolant 43 may be contained within the casing 35 so as to completely surround the assembly for absorbing heat therefrom more readily than would be possible should the assembly 10 be allowed to remain in air. Such cooling might very well be important, of course, when rapidly pulsed intermittent, or continuous laser operation is being conducted. In fact, as indicated at 45 and 47, it would even be possible to provide a pair of conduits in wall portions of casing 35 so that the cooling liquid may be caused to flow through the casing during such laser operation.

Having described our invention, we claim:

1. A laser assembly comprising a relatively thin, elongated main body structure and elongated pumping light source means disposed in adjacent substantially parallel side-by-side relation to each other, said pumping light source means comprising an elongated flash tube of predetermined external dimensions and emission characteristics, said main body structure comprising a relatively thin, elongated rod-like laser component having smooth side wall portions formed thereon and extending throughout the length thereof, and a cladding surrounding said rod-like component and disposed in intimate contacting relation with all parts of said smoooth side wall portions throughout the length of said component, said rod-like component being formed of a laser glass having a predetermined refractive index, said cladding being formed of a glass which is transparent to optical energy at the pumping wavelength of said laser glass and has a refractive index which is very nearly equal to the refractive index of said laser glass, optically finished surfaces formed on the opposite ends of said rod-like component, said cladding having a relatively deep recess formed in an outer side wall portion thereof which extends throughout the length of said component and which is of such predetermined concave curvature, considered in the transverse direction of said body structure, as to receive a very material part of the external side wall surface area of said elongated flash tube in closely nested assembled relation therewith and in close proximity to said rod-like component, the outer peripheral surface portions of said cladding adjacent said flash tube when said flash tube is assembled therewith being so shaped and disposed relative to said flash tube as to tend to reflect most of the light received thereby from said flash tube generally toward said laser component, and a highly reflective layer of metallic material disposed in surrounding closely fitting relation to said main body structure and said pumping light source means throughout the greater part of the length of said assembly, whereby a close optical coupling between said main body structure and said pumping light source means in assembled relation therewith, as well as good heat conductivity from the light source to the exterior of said laser assembly, will be provided.

2. A laser assembly as defined in claim 1 wherein the size and shape of said relatively deep recess in said cladding is such as to enclose from one-third to one-half of the exterior surface of said flash tube when in assembled side-by-side relation thereto.

References Cited
UNITED STATES PATENTS 3,162,822  12/1964  Tackaberry _____ 331—94.5
3,356,966  12/1967  Miller _____ 331—94.5

RONALD L. WIBERT, Primary Examiner

P. K. GODWIN, JR., Assistant Examiner